UNITED STATES PATENT OFFICE.

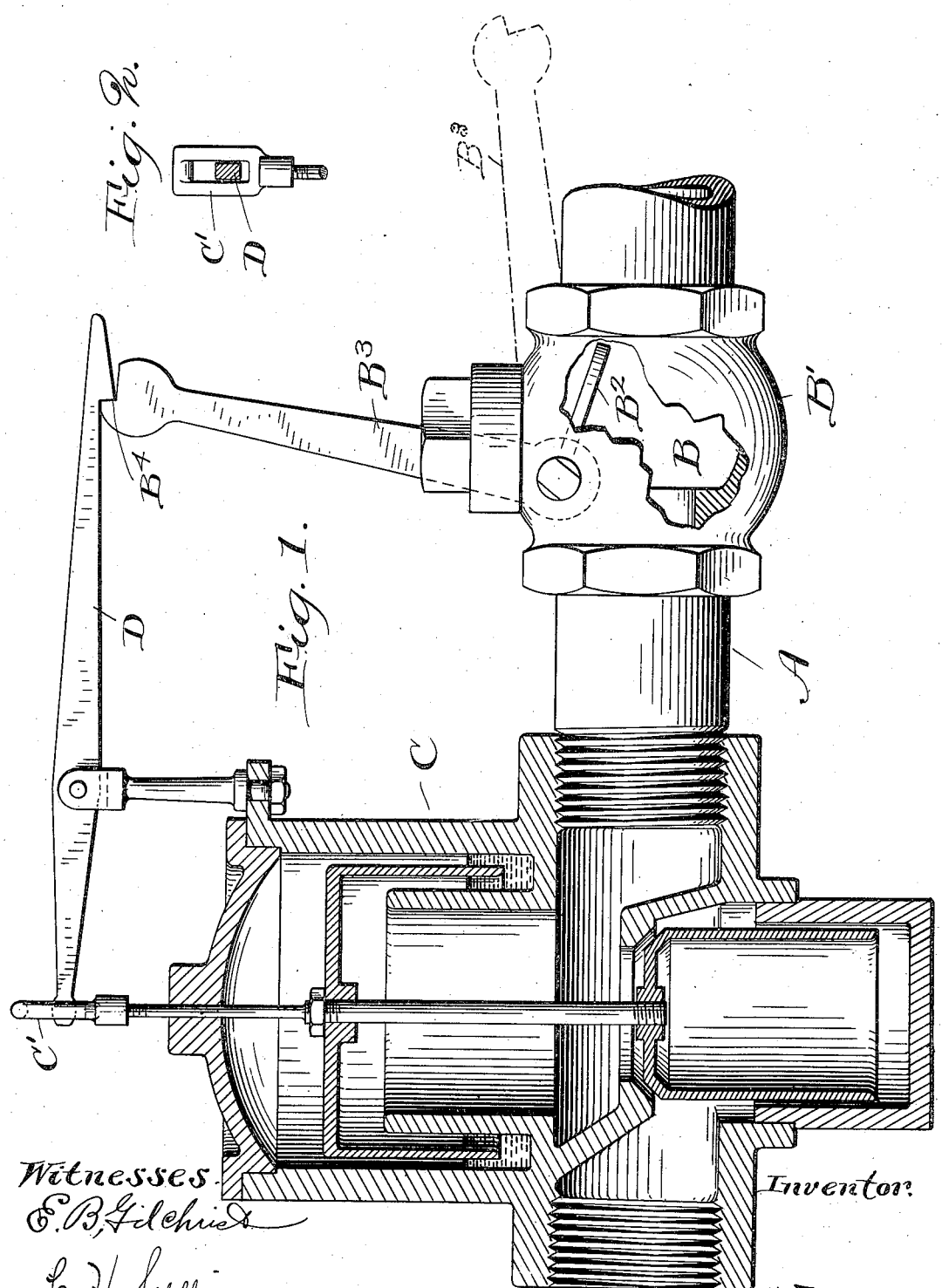

CHARLS M. BROWN, OF CLEVELAND, OHIO.

AUTOMATIC CUT-OFF.

933,880. Specification of Letters Patent. Patented Sept. 14, 1909.

Application filed March 27, 1907. Serial No. 364,764.

*To all whom it may concern:*

Be it known that I, CHARLS M. BROWN, a citizen of the United States, residing at Cleveland, in the county of Cuyahoga and State of Ohio, have invented a certain new and useful Improvement in Automatic Cut-Offs, of which the following is a full, clear, and exact description.

The object of the present invention is to provide an automatic cut-off, adapted for use in connection with fluid regulators.

More particularly, my object is to provide a simple and effective safety device for use in natural gas mains and similar locations which may be employed with practically all types of pressure regulators, including the ones which are now in common use.

In producing the invention forming the subject of this application, I have had the above objects in view and have kept in mind the fact that the safety device should be one constructed of the fewest possible number of parts and capable of ready attachment or insertion to an existing regulating system without in any manner impairing its efficiency as an operating device.

An embodiment of my invention is shown in the accompanying drawings in which—

Figure 1 is a side elevation, partly in section, showing the safety device used with an ordinary bell regulator. Fig. 2 is a detail showing the loop allowing the movement on the part of the regulator within certain limits without throwing the automatic cut-off into action.

In installing the device in, for example, a natural gas main, A, I may locate the cut-off B on the high pressure side of the controlling device C, which, in the present instance, is shown to be a conventional regulator. But it is to be observed, with the particular cut-off which I have invented, it is not material that the cut-off be located on the high pressure side of the controller, and in this it is distinguished from the majority of cut-off devices hitherto known in the art since the majority of these prior devices have been so connected with the controller that it was advisable to have them located on the high pressure side of the controller in order that, if, after the cut-off was thrown into operation, the pressure should subsequently rise, the controller would not affect the cut-off. But as before mentioned, this is a contingency which need not be looked after with my device, since the cut-off when once thrown into action is absolutely independent of the controller.

As shown in Fig. 1, the cut-off device B which I employ may be mounted in a short union section B' capable of being let into the pipe connections at any point. In this section is a valve seat designed to be closed by a swinging flap valve $B^2$ which hangs in such a manner that the gas pressure would tend to hold it to its seat. Rigidly connected to one of the trunnions on which the valve swings is a controlling arm $B^3$ outside of the pipe section and having a shoulder $B^4$ at one end by which it may be held up in such position that the valve is away from its seat. Pivotally mounted on an adjacent standard is a detent lever D designed to catch the shoulder in the controlling arm $B^3$, and hold it at such an angle that, when released, the weight of the valve and the arm will cause them to drop to such position that the valve will bear against its seat and be held thereto both by the weight of the controlling arm and the gas pressure bearing thereagainst.

For the purpose of tripping the detent lever when the gas pressure comes to the danger point, the controller, which is of any suitable type but which in the present instance is shown as having a bell regulator, is provided with a loop C' which may be attached to the guide rod of any regulator or controller now in use, this loop being screwed on to the end of the rod and easily adjustable so as to cause it to trip the lever at the desired point. When the gas pressure is working at or above the normal point, the pressure regulator or controller is, in the form shown, without effect upon the safety cut-off, obviously. When, however, the pressure is such that the controlling device is allowed to drop to a predetermined point, the loop D attached thereto will operate the detent lever so as to release the valve controlling arm and allow it to immediately fall into the position where the valve is held against its seat. The valve will, therefore, being held by the weight of the controlling arm and gas pressure thereon, remain closed until it is again lifted to open position by hand; and it will be seen that no subsequent rise in the pressure can affect this cut-off, regardless of on which side of the controlling device or regulator it may be placed.

It will be seen that in accordance with the object of the invention as stated, I have produced a cut-off which is composed of the fewest possible number of parts and is capable of insertion at any point of an existing system and capable of use with practically all styles of present controlling devices.

Having thus described my invention, I claim:

An automatic safety cut-off comprising a valve seat, a swinging valve on the ingress side of said seat, an arm outside of the valve casing connected with said valve and having an abrupt shoulder at its upper end, a pivoted lever having a shoulder adapted to engage with the shoulder on said arm and to thereby prevent said arm from swinging in the direction which will permit the valve to close, a vertically movable water sealed float in the gas conduit and subject to the pressure of gas therein, a stem secured to said float and extending vertically therefrom and having a shoulder at its upper end which overhangs one arm of said lever.

In testimony whereof, I hereunto affix my signature in the presence of two witnesses.

CHARLS M. BROWN.

Witnesses:
E. B. GILCHRIST,
E. L. THURSTON.